Inventors
Wolfgang Ohlendorf
Eduard Schultes
By their attorneys

Howson and Howson

Inventors
Wolfgang Ohlendorf
Eduard Schultes
By their attorneys

Howson and Howson

United States Patent Office 3,263,277
Patented August 2, 1966

3,263,277
HOLD-SHUT DEVICE FOR INJECTION MOLDING
Wolfgang Ohlendorf, Monchen-Gladbach, and Eduard Schultes, Rheydt, Germany, assignors to Mannesmann-Meer Aktiengesellschaft, Monchen-Gladbach, Germany, a German company
Filed June 4, 1963, Ser. No. 285,474
8 Claims. (Cl. 18—30)

The invention concerns a hold-shut device for materials processing apparatus, and more particularly such a device adapted for use in injection molding machines for the processing of thermoplastic masses. In such machines two mold halves are mounted, one on a stationary element and the other on a traverse element which can be shifted and locked in position by an hydraulic mechanism.

The requirements for the operation of injection molding machines are that a closure piston at the beginning of the operative cycle shall move the traverse element, with its associated mold-half, as rapidly as possible and with little force in an idle-motion travel toward the opposed and stationary mold-half. This movement should then be changed so as to effect contact of the mold halves as gently as possible at low speed, for the purpose of thereafter holding the mold halves together with great force, against the action of the thermoplastic mass injected under high pressure. The holding-shut force has to be greater than the projected area of the mold interior or hollow at the plane of separation of the mold halves multiplied by the specific pressure with which the thermoplastic mass is injected into the mold. After the injection, the withdrawal movements are carried out in reverse order. A large mold opening or separation force is then applied for a short distance of traverse, and the remaining withdrawal of the traversing mold half to an inoperative position is accomplished rapidly and with less force. The movement continues as far as that position of the traversing mold half which is most remote from the stationary mold half. Desirably at a certain point during this stroke there may be another increase of the displacement force, with a simultaneous decrease of speed, for the purpose of causing the ejection.

It is known how to effect these motions with a single cylinder, but the cross-section of the piston therein must be designed large enough to produce the necessary hold-shut force with the operative pressure provided.

In view of the facts set forth above, the amount of hydraulic fluid medium under pressure, needed to effect this inoperative stroke, is very great relative to the resulting pressure loss. For this reason, apparatus such as presses are now generally constructed so that the fluid medium under the pressure required for the rapid inoperative stroke is supplied at relatively low pressure from a special tank by means of a special and very expensive supply valve. Such a supply valve is also needed in order that the main piston, operated in a high-pressure, high-speed cylinder can withdraw from a tank the quantity of fluid medium required for the cylinder space becoming available. It is known how to supply hydraulic fluid medium under pressure, to a single cylinder, by means of a self-regulating pump which switches over from a very great volume of hydraulic fluid medium at low pressure for the inoperative stroke, to a very small volume at a relatively very high pressure at substantially constant performance for the hold-shut stroke. With the known arrangements, however, it is not possible to bring about gentle contact of the mold halves with each other, because it is only after they come together that it is possible to initiate the reversal of controls, through the momentary rise of pressure. In order to effect gentle contact of the mold halves with each other it is necessary to provide additional apparatus, such as braking pistons; throttling places in the cylinder; preliminary switch-offs; or the equivalent. One drawback of this arrangement is the occurrence of disturbances with such self-regulating pumps during the operation at very high pressure and with very low output, particularly in the case of injection molding machines having relatively long hold-shut time periods. With such self-regulating pumps it is often necessary to produce a greater pumped volume of fluid medium under pressure than is actually necessary to effect the holding-shut, and then to release the excess fluid medium under pressure by means of a safety valve, while developing useless, undesirable heat.

It has heretofore been suggested that a single cylinder be divided up into one shift cylinder of relatively small diameter for the inoperative stroke, and one hold-shut cylinder of relatively great diameter, moving with it for a stroke of only a few millimeters. By this means, it is possible to make the shift cylinder of such a length that bringing the mold halves into contact with each other is just avoided. The shift cylinder is then locked mechanically in the end position it has assumed at that moment, for the purpose of being able to withstand the reaction pressure of the hold-shut cylinder after the latter has brought the mold-halves slowly into contact. The same principle applies to a greater degree with a lateral arrangement of the shift cylinder by employing plunger pistons.

The drawback of the foregoing design is that in order to operate the hold-shut cylinder, which is moved by the shift cylinder, it is necessary to use mobile conduits for the fluid medium, such as hoses, jointed or telescopic tubes, or equivalent elements. With the relatively high pressures that have to be conveyed to the hold-shut cylinder and with the relatively long stroke of the shift cylinder these mobile conduits often have troublesome breakdowns. We recognize that workers normally skilled in the art can locate the supply conduits for both operative chambers of the cylinder inside the piston rod, if that cylinder is moved upon a stationary piston. Such a solution, however, is possible only with a displaceable cylinder and then only when relatively low pressures are to be transmitted. Another drawback of the known arrangements is that the expense of and the number of control elements are relatively great. Also the likelihood of breakdowns is high.

The present invention overcomes the above-mentioned drawbacks, and has an hydraulically operated shifting and locking device for injection molding machines and presses, which device has advancing (forward shifting) and withdrawing motions, traverses rapidly during the inoperative phases and is lockable for clamp-up phases. This device is integrally associated with a hold-shut device having a very short stroke during mold contact and clamp-up, being operated with great force during these phases, the arrangement of these devices reducing the frequency of occurrence of breakdowns. This lowers the capital investment required, needs a minimum of control elements, provides rigid hydraulic conduits; and also at the same time effects lower operating costs and minimum idle or down times, throughout an optimum technical-economic range.

Expressed another way, rapid movement forward of the traversing mold half to a point just short of contact with the stationary mold half, effecting gentle contact of the mold halves together, and thereafter providing very great hold-shut force, are movements that known apparatus can be arranged to provide. It has also been noted above that a great mold-opening force can be made available during a short portion of the withdrawal movement of the traversing mold half, and that said withdrawal can thereafter be rapidly completed. A subsequent increase in tear-loose force can be provided during said movement, with a simultaneous decrease of traverse speed. Most of these movements can be effected with a single cylinder apparatus. Such apparatus, however, as it has heretofore been known, is not practically feasible to use. Special and quite expensive valves are required; a self-regulating pump is necessary. Furthermore, even with this equipment not all of the movements recited above can be accomplished. The gentle mold contact stroke, for example, cannot be achieved in combination with the other motions, without use of considerable additional apparatus which itself is susceptible to various malfunctions. Furthermore, the operating efficiency of this apparatus is such that production must be had of a greater pumped volume of fluid medium under pressure than is necessary to effect actual hold-shut. This excess fluid must be released through a safety valve, with resultant generation of heat.

Division of the usual cylinder into plural cylinders having different diameters provides the needed gentle contact stroke, but mobile fluid medium conduits are necessary to make possible the operation of the hold-shut cylinder, which in turn operates the shift cylinder. Such conduits often have troublesome breakdowns, despite the expense and care given to their manufacture. It must be recognized that the hydraulic apparatus used in thermoplastic molding processes is often subjected to pressures of a very high order. Mobile conduits cannot long withstand such pressures.

The great advance of the present invention is in the discovery that all the required movements can be effected with a single shift cylinder. The shift piston and the hold shut piston operate in spaces in the cylinder which are different in diameter but not separate. In other words they are spatially directly united, i.e. merged into each other without a separating wall. Each chamber houses a piston, a small stationary shift piston in the smaller diameter cylinder chamber, and a large, traversing hold-shut piston in the larger diameter cylinder chamber. There is no wall between the cylinder chambers and the pistons. The shift cylinder per se traverses on the small, stationary shift piston. This structure makes possible the installation of rigid, immovable conduits, which fact positively ensures reduction of frequency of equipment failure. Disposition of the conduits within and through the stationary shift piston and its piston rod both eliminates what would otherwise be a need for complex porting of the conduit, and also provides for ready supplying and draining of fluid medium by a source that is common to both cylinder chambers, and in particular is also common to both sides of the smaller diameter cylinder chamber. By adding three hydraulic slide valves, two pumps to vary the pressure as needed, and a displacement plunger, applicants offers relatively simple, inexpensive, reliable, durable apparatus that will readily perform the required sequence of motions under the high pressure conditions customarily encountered, with a minimum of fluid medium under pressure. The displacement plunger, installed to reduce volume of the smaller diameter chamber as well as the area of the stationary shift piston, during forward traverse of the shift cylinder, thus reducing the force and amount of fluid needed for forward shift, serves this function particularly well in combination with the differential hook up of the shift cylinder, the ratio of the diameters of which can be readily determined by workers in the art. The displacement plunger thus enables high speed traverse of the shift cylinder to be accomplished, quickly bringing the mold halves to point of contact. High pressure fluid medium is then introduced through the same conduit, and bearing against the large, hold-shut piston exerts powerful contact and clamp up of the mold halves.

The common supply to the pistons operating in the spatially united, i.e. merging cylinder chambers of different diameters without separating wall does have the drawback that the traversing hold-shut piston because of its great area goes immediately into that end position which corresponds to its hold-shut position, *before* the forward shift of the shift cylinder, and, therefore, of the cylinder chambers, begins. Consequently, it might be thought impossible to obtain a contact and clamp-up stroke of the traversing hold-shut piston and a locking of the shift cylinder against traverse. The invention solves this second problem by providing that the traversing hold-shut piston shall, at least during the forward shift of the shift cylinder, and in spite of the common supply of fluid medium, be held in that one of its end positions which is opposite to its hold-shut position.

In accordance with the invention provision is made for the clamp-up stroke of the traversing hold-shut piston by causing to be impressed on the withdrawal face of the said piston, during the forward-shift of the shift cylinder and cylinder chambers therein, a force that is greater than the opposing force of the forward shift movement. The hold-shut piston is thus held in that end position which is opposite its clamping or hold-shut position. This operative condition can be achieved by conventional, and known means such as, for example, springs, pressure from an accumulator, or the equivalent. The consumption of fluid medium under pressure, that is entailed by this design, can be substantially decreased by providing, also in accordance with the invention, at that end face of the traversing hold-shut piston which is directed toward the stationary shift piston (in other words, the forward shift face) a seal to limit the effective pressure area during the forward shift. This seal becomes effective under the action of the withdrawal force applied to the hold-shut piston during mold-opening.

The withdrawal force required in special cases by the traversing hold-shut piston to obtain great mold-opening strength is obtained in accordance with the invention by having the pressure of fluid medium bearing against the withdrawal face of the said piston generated by means of conventional, known supply and control elements that participate in the movement of the shift cylinder and of the traverse and support member, so that the reaction force is conveyed by way of the shift cylinder from the stationary shift piston to the withdrawal face of the traversing hold-shut piston.

The characteristics of the invention referred to above, and other essential characteristics of the invention, are evident from the description of the examples of construction shown in the drawings of the invention of the shifting and holding device for injection molding machines.

In the drawings, schematically;

Figure 1:
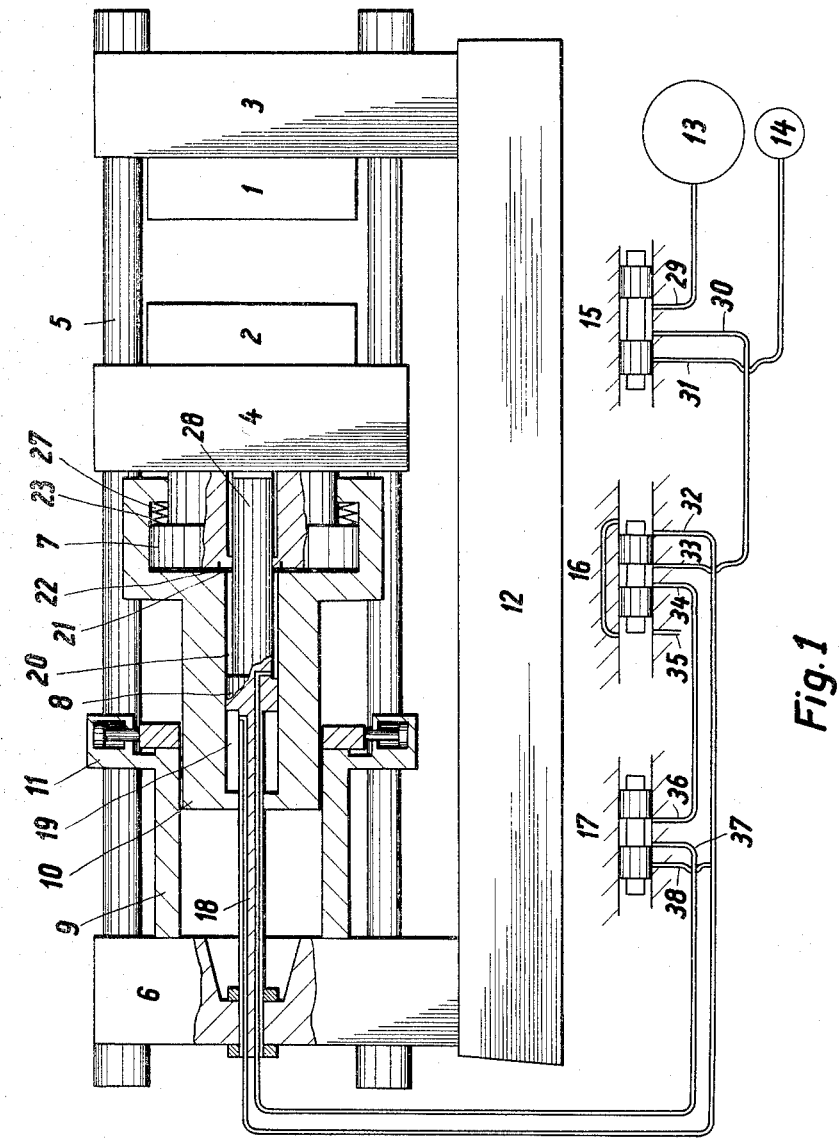
FIGURE 1 is a lengthwise section through the shifting and locking device of the invention during the forward-shifting movement thereof.

To make the drawings clearer, certain machine elements not required for understanding the construction and the method of operation are omitted, such elements being, for example, screws, and the like.

Mold halves 1 and 2 are mounted on a fixed support element 3 and a traverse support element 4, respectively. The tensile force produced during the closure of the mold is taken by bars 5, which are fastened in the fixed element 3 and another support element 6. The traverse support element 4 is guided on the bars 5 and is also fastened to a hold-shut piston 7. There is a stationary shift piston 8 immovably mounted on the fixed element 6. Guides 9 are provided for a shift cylinder 10 enclosing piston 8. There are locking devices 11 integral with guides 9 also mounted on the fixed element 6. The apparatus is installed on a base or frame 12 of the machine.

Figure 3:
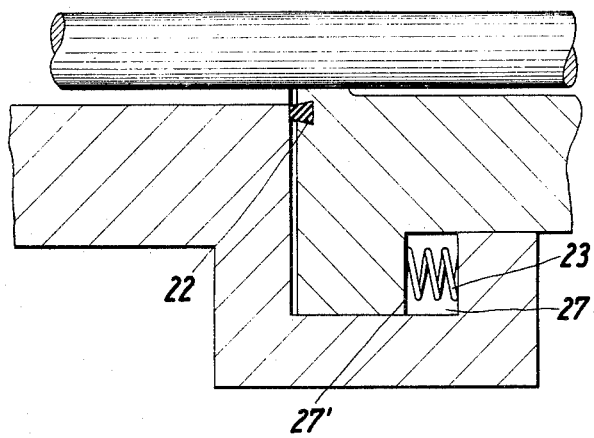
FIGURE 3 is a diagrammatic representation on a larger scale of the traversing hold-shut piston with a seal on its forward shift face, in which the means producing the sealing force are springs.
Figure 4:
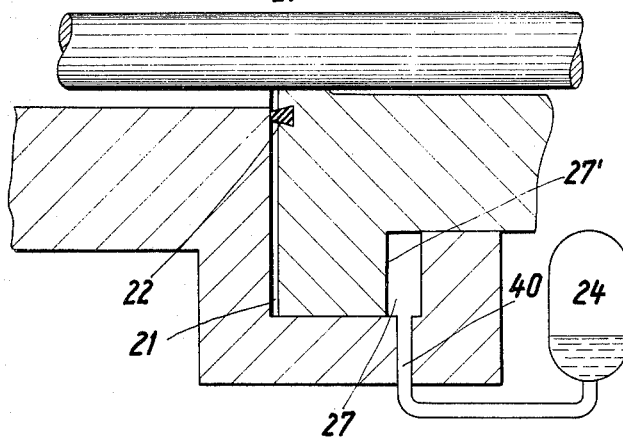
FIGURE 4 is a view similar to FIGURE 3 illustrating the use of a pressure accumulator instead of springs.
Figure 5:
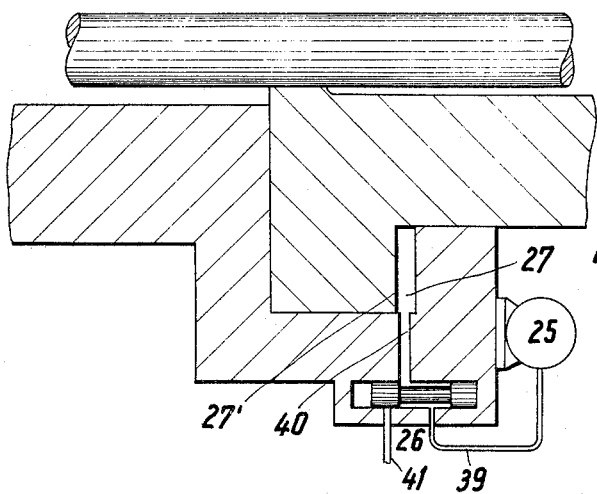
FIGURE 5 shows a modification of a pressure-applying piston and how it can be connected up so as to obtain increased tear-loose strength.

The apparatus is operated by means of a low-pressure pump 13 having a high volume output and a high-pressure pump 14 of lower volume output. The pumps are connected to cylinder chambers 19 and 20 of the shift cylinder 10 by way of a pressure-reversing slide 15, a secondary pressure-reversing slide 16, and a slide 17 for controlling the differential loading of the stationary shift piston 8 through a piston rod 18. This rod 18 is connected to the shift piston 8 and is bored to receive connections from pumps 13 and 14. During forward shift phases cylinder chamber 21 is sealed off from cylinder chamber 20 by a seal 22. This can be done as is shown in FIGURE 3 by means of springs 23, or as is shown in FIGURE 4 by using a pressure accumulator 24. Another possibility, as shown in FIGURE 5, which also results in obtaining very high tear-loose strength, is without the seal 22. Instead of the springs 23 or the pressure accumulator 24, use is made in this case, for the purpose of supplying fluid medium under pressure to cylindrical chamber 27, and by way of illustration, of a small high-pressure pump 25 having a low output, and of a control slide 26, which pump and slide are fastened to the traverse and support element 4 or to the shift cylinder. A displacement plunger 28 is fastened to the stationary shift piston 8, and passes through the hold-shut piston 7. The displacement plunger 28 decreases the operative area of the stationary shift piston 8, and also the volume of the cylinder chamber 20, to such an extent that the force needed for the forward shift is obtained with a minimum amount of oil.

The operation of the shifting and holding device is as follows: After the pumps are started, the medium under pressure flows in FIGURE 1 from the low pressure pump 13 by way of the pressure reversing slide 15 and its connections 29 and 30 to the second slide 16, through its connections 33 and 34, and then by way of slide 17 and its connections 36 ad 37 into the cylinder chamber 20. The emptying of the cylinder chamber 19 is by way of the slide 16, connections 32 and 35 to the tank.

The pressure that builds up in the cylinder chamber 20 shifts the shift cylinder 10, and thus also the traverse and support element 4 with mold half 2 mounted thereon toward the right (i.e. forward), so that the traversing hold-shut piston 7 seals off the cylinder chamber 21 by means of the seal 22, through the intermediary of the springs 23, or through the force from the accumulator 24 of FIGURE 4.

The displacement plunger 28 decreases the effective piston area of the stationary shift piston 8 to the extent that said piston combines with the fluid medium under pressure from the low-pressure pump, to generate the required shifting force. The foregoing factors result in a favorable distance-time diagram with relatively little circulation of the fluid medium under pressure.

When the shift cylinder 10 arrives in its forward position, the hold-shut system is locked, by any known manner, before the mold halves 1 and 2 contact each other, the locking described here being by means of the locking cylinders, pistons and slides 11.

Figure 2:
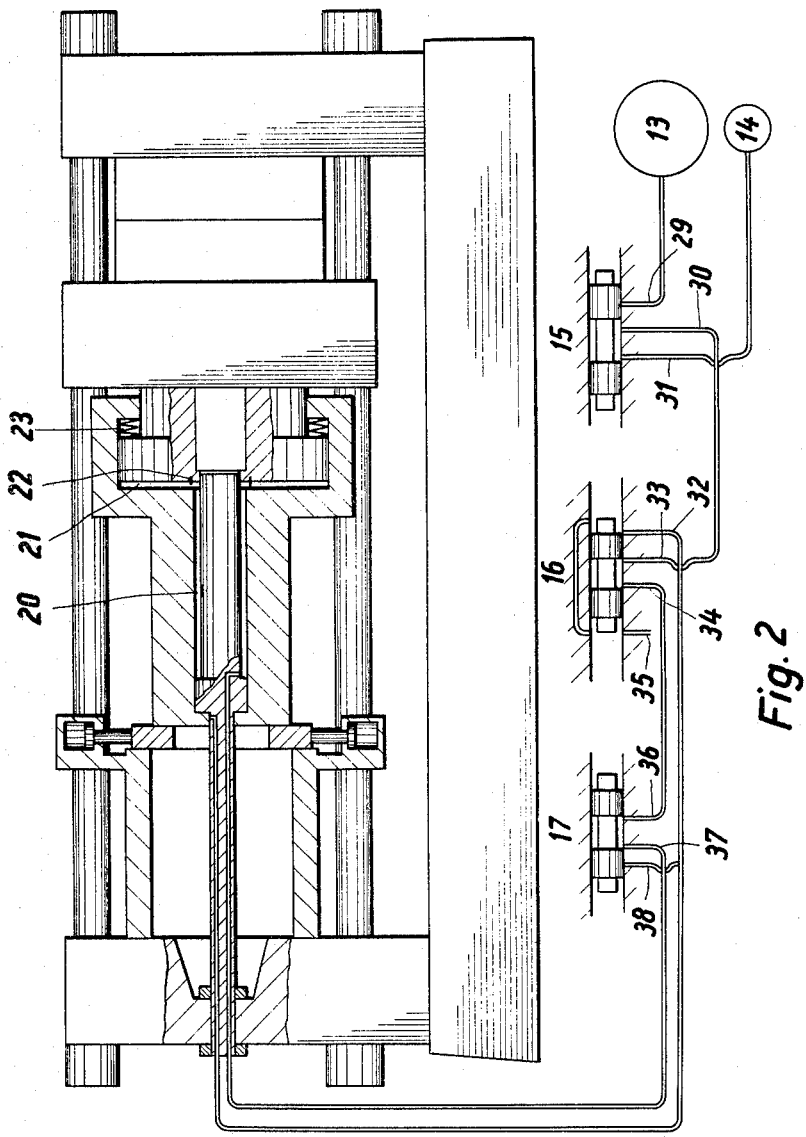
FIGURE 2 is the same section in the hold-shut position.

A shift of the slide 15 as in FIGURE 2 closes the connection 29 and opens 31, so that now the cylinder chamber 20 is supplied with fluid medium under high pressure, whereby the force of the springs 23, or the pressure from accumulator 24 of FIGURE 4, is overcome, the seal 22 is disengaged, and high pressure comes into the cylinder chamber 21. The mold halves 1 and 2, because of the enlarged piston area, are slowly and gently brought into contact with each other. Thereafter they are pressed against one another with maximum hold-shut force.

The opening operation occurs in the revesre sequence.

By means of a shift of the slide 16 the cylinder chamber 20 is relieved of pressure through the connections 34 and 35; the force of the springs 23 or the force of the accumulator 24 releases the hold-shut system; the locking devices are released, and high-pressure fluid in cylinder chamber 19, supplied through the connections 33 and 32, opens the hold-shut device with suitably great force. By shifting the slide 15 the greater output from the low-pressure pump 13, going through the connections 29 and 30, increases the opening speed while using little force. A shift of the slide 17 makes it possible, through the connecting-in of the lead-in conduits 37 and 38, as well as through shutting the return-flow conduit 36, for the pressure medium expelled from the cylinder chamber 20 to supply the cylinder chamber 19 in a supplementary way, resulting in a further increase of the opening speed.

If, for the purpose of ejecting the molded object from mold half 2 there is need of an ejection using increased force, then at any suitable place in the opening movement, which suits the operating conditions for the molded object that is to be ejected, this ejection can be effected as follows:

Changing slide 17 over into its original setting, and at the same time changing of slide 15 from low-pressure over to high-pressure, permits the fluid medium under pressure to enter cylinder chamber 19 from the high-pressure pump 14 by way of the connections 31, 30, 33 and 32, the cylinder chamber 20 being emptied by way of the connections 37, 36, 34 and 35. The opening speed is thereby diminished to correspond with the lower output from the high-pressure pump, with a simultaneous increase of the withdrawal force used during the ejection operation, thus providing gentle but powerful ejection.

Another design of the shifting and holding device for obtaining greater ejection force provides, as shown in FIGURE 5, a high-pressure jump 25 having a low output, and its associated control slide 26 connected to the parts of the machine that make the opening and closing movements. The way in which this hold-shut arrangement works is in principle the same as that which has been described above, with the limitation that during the opening and closing operations, when the cylinder chamber 20 is supplied with low pressure, fluid cylinder chamber 27 is supplied with high pressure fluid by means of the pump 25 through the intermediary of the slide 26 and the connections 39 and 40. The traversing hold-shut piston 7, because of the greater force acting against its reverse face 27', is held in that end position remote from its forward position. This greater pressure is released for the hold-shut phase by reversing the slide 26, the pressure escaping from the cylinder chamber 27 by way of the connections 40 and 41.

An example using estimated numerical values clearly shows the functional characteristics of the suggested shifting and locking device.

Assumed values: (Mp. represents "megapond"—an international unit of force equal to 1 kg. or 2.2 lbs. U.S.—M stands for 1000)

Low perssure—70 atmospheres gauge
High pressure—140 atmospheres gauge
Hold-shut force—800 mp. (megaponds)
Shift force—20 mp. (megaponds)

The stationary shift piston 8 and the displacement plunger 28 are so related to one another that when the effective piston annular area in cylinder chamber 20 has 70 atmospheres gauge, low pressure, bearing against it, a forward shift force of 20 megaponds or 44,000 lbs. U.S. is produced. The reaction force appearing at the area of the traversing hold-shut piston 7 delimited by the seal 22 is overcome by the force of the springs 23, which are designed to produce a force of 25 megaponds, or 55,000 lbs. U.S., or by the force from the accumulator 24, so that the traversing hold-shut piston 7 is held in that end position remote from the hold-shut position. Upon switching over to 140 atmospheres gauge, high pressure, the forward shift force becomes doubled from 20 megaponds to 40 megaponds, or 88,000 lbs. U.S., and thus overcomes the force of the springs or accumulator, and, after disengaging the seal 22, provides high-pressure access to the cylinder chamber 21. The diameter of the traversing hold-shut piston is designed so that, after subtraction of the spring or accumulator force of 25 mp., a hold-shut force of 800 mp. or 1,760,000 lbs. U.S. acts upon said piston.

During the opening of the shifting and locking device, the cylinder chamber 20 is relieved of pressure, so that 25 mp. of spring or accumulator force presses the traversing hold-shut piston 7 back again to that end or initial position remote from the hold-shut position. The stationary shift piston 8 designed with an area ratio of 2:1, now has 140 atmospheres, high pressure, bearing against it from cylinder chamber 19, which pressure corresponds to a withdrawal force of 80 mp. bearing on that surface of the shift cylinder which faces the stationary shift piston. Through the switch-over to 70 atmospheres low pressure, the withdrawal force decreases to 40 mp., with an increase of the withdrawal speed corresponding to the pumped output. A subsequent connection of the cylinder chambers 19 and 20, through the slide 17 and its connection 37 and 38, with a simultaneous closure of the return-flow conduit 36, doubles the withdrawal speed, with a simultaneous decrease of the withdrawal force to the specified shifting force of 20 mp.

By reversing the slides 15 and 17 the pressure medium circuit of cylinder chambers 19, 20 through the connection 37 and 38 is interrupted. The high-pressure pump 14 through the connections 31, 30, 33, 32 supplies the cylinder chamber 19, and the cylinder chamber 20 is relieved of pressure through the connections 37, 36, 34, 35, through which a slow-down of the opening speed occurs to correspond with the lower output from the high-pressure pump 14, with a simultaneous increase of the withdrawal force from 20 mp. to 80 mp. to perform the ejection.

For the purpose of increasing the withdrawal force, in accordance with FIGURE 5, the seal 22 of the traversing hold-shut piston 7 is eliminated, the diameter of that piston being made great enough so that when its hold-shut or forward shift face is subjected to 140 atmospheres gauge, high pressure, the piston delivers a hold-shut force of 800 mp., which corresponds to a load of 400 mp. at 70 atmospheres gauge, low pressure, during the forward shift phase. With an area ratio of 1.8:1, and subjection of the annular face 27' in the cylinder chamber 27 to 140 atmospheres gauge, high pressure, the 400 mp. on the left or forward shift side of the piston are opposed to 450 mp. on its right or withdrawal side, so that retention of the piston in its left-hand end unlocked or initial position is ensured. The conditions for the stationary shift piston 8 are kept the same as in the above example, so that here too a shifting force of 20 mp. is produced.

Upon switching over from 70 atmospheres gauge pressure to 140 atmospheres gauge pressure in the cylinder chamber 20, with a simultaneous release of pressure from the cylinder chamber 27, the entire hold-shut force of 800 mp. acts on the traversing hold-shut piston 7; while on the other hand, during the opening of the shifting and locking device, because of the pressure bearing on the annular piston area 27' in the cylinder chamber 27, and the release of pressure from the cylinder chamber 20, a mold-opening force of 400 mp. is obtained. The force and speed conditions during the continuance of the opening operation correspond to those described above.

It is to be understood that the various preferred and alternative embodiments of this invention, as described above and in the claims that follow, are not intended to limit the scope of the invention thereto. Modifications not here suggested which may occur to those normally skilled in the art are also considered to be within the ambit of the invention.

What we claim is:
1. A hold-shut device for injection molding apparatus comprising a frame for the apparatus,
   a stationary mold segment mounted on the frame,
   a member slidable along the frame,
   and a traverse mold segment fixedly mounted on the slidable member,
   in combination with a shift body slidably mounted on the frame and having two chambers of different diameters spatially and directly united merging into each other within the shift body,
   locking means to immobilize the shift body at a predetermined position along the frame,
   a stationary shift piston mounted immovably within one chamber of the shift body,
   a hold-shut piston within the remaining chamber of larger diameter than that containing the stationary shift piston of the shift body, attached to the slidable member and movable therewith relatively to the shift body,
   a withdrawal face on said hold-shut piston and force-exerting resilient means on the withdrawal face,
   a supply of hydraulic fluid,
   rigid conduits to and from the hydraulic fluid supply, drilled into and through the stationary shift piston and providing fluid supply common to the cylinder chambers,
   low and high pressure pumps connecting the rigid conduits to the fluid supply,
   and pressure reversing and differential control slides associated with the pumps, the rigid conduits and the fluid supply, to control movement of the hold-shut piston within the shift body;
      whereby the shift body and chambers therein are movable relative to the stationary shift piston and the hold-shut piston has a very short, powerful mold clamp-up stroke.

2. The hydraulic shifting and locking device claimed in claim 1 in which
   the said force exerting means are coil springs.

3. The hydraulic shifting and locking device claimed in claim 1 in which
   the said force exerting means is a pressure accumulator.

4. The hydraulic shifting and locking device claimed in claim 1 in which
   the said force exerting means is a high-pressure pump and slide adapted to supply fluid medium under pressure to the withdrawal face of the hold-shut piston, and then to drain said medium therefrom.

5. The hydraulic shifting and locking device claimed in claim 1 in which
   there are means to decrease the effective area of the hold-shut piston during the forward shift stroke of the device.

6. The hydraulic shifting and locking device claimed in claim 5 in which
   the hold-shut piston has a surface facing the stationary shift piston,
   and in which the effective area decreasing means is a seal on that surface.

7. The hydraulic shifting and locking device claimed in claim 5 in which
   there is a displacement plunger common to the shift body chambers to reduce the volume of hydraulic fluid needed during shifting.

8. Injection molding apparatus with a hold-shut device comprising a frame for the apparatus,
   a mold half immovably mounted on the frame,
   a support member slidable along the frame,
   and a traverse mold half fixedly mounted on the slidable support member,
   in combination with a shift cylinder slidably mounted on the frame and having two chambers of different diameters spatially and directly united merging into each other within the shift cylinder, locking means to immobilize the shift cylinder at a predetermined position along the frame, a stationary shift piston fitted within the cylinder chamber of lesser diameter, and fixed to the frame, a hold-shut piston fitted within the cylinder chamber of greater diameter, fixed to the slidable support member and movable independently of the shift cylinder, and having a forward shift surface disposed toward the stationary shift piston, a supply of hydraulic fluid, rigid conduits to and from the supply of hydraulic fluid, drilled into and through the stationary shift piston and providing fluid supply common to the cylinder chambers, low and high pressure pumps connected to the rigid conduits and fluid supply, a displacement plunger protruding from the stationary shift piston into the hold-shut piston to enable the mechanism to be quickly shifted with a minimum amount of fluid at low pressure, a seal on the forward shift surface of the hold-shut piston to further reduce the quantity of low pressure fluid needed to shift the mechanism, pressure reversing and differential control slides associated with the pumps, the rigid conduits and the fluid supply to cause disengagement of the seal, and to effect gentle mold contact, and subsequent powerful clamp-up of the mold-halves as high pressure fluid bears against the forward shift surface of the hold-shut piston, a withdrawal surface on the hold-shut piston, disposed toward the mold halves and slidable support members, and spiral springs on the withdrawal surface to immobilize the hold-shut piston against the force of the rapid forward shift stroke of the shift cylinder;

whereby the traverse mold-half is shifted forward quickly, at low pressure, almost to contact the stationary mold half; gentle contact and powerful clamp-up are effected at great pressure, and whereafter a reversal of the system provides a strong withdrawal stroke for product and mold breakaway, a swift withdrawal stroke, and powerful ejection.

References Cited by the Examiner
UNITED STATES PATENTS

| | | | |
|---|---|---|---|
| 2,465,204 | 3/1949 | Dalton | 18—30 |
| 2,689,978 | 9/1954 | Roger | 18—30 |
| 2,988,778 | 6/1961 | Chase et al. | 18—30 |
| 3,008,189 | 11/1961 | Harvey | 18—30 |
| 3,156,014 | 11/1964 | Wenger | 18—30 |

J. SPENCER OVERHOLSER, *Primary Examiner.*

MICHAEL V. BRINDISI, *Examiner.*

W. L. McBAY, *Assistant Examiner.*